(12) United States Patent
Wiltsey et al.

(10) Patent No.: US 6,868,236 B2
(45) Date of Patent: Mar. 15, 2005

(54) APPARATUS AND METHOD FOR COMBINING MULTIPLE OPTICAL BEAMS IN A FREE-SPACE OPTICAL COMMUNICATIONS SYSTEM

(75) Inventors: Thomas J. Wiltsey, Woodinville, WA (US); David L. Rollins, Woodinville, WA (US); Robert M. Pierce, Woodinville, WA (US)

(73) Assignee: Terabeam Corporation, Falls Church, VA (US)

( * ) Notice: Subject to any disclaimer, the term of this patent is extended or adjusted under 35 U.S.C. 154(b) by 0 days.

(21) Appl. No.: 10/198,980

(22) Filed: Jul. 18, 2002

(65) Prior Publication Data

US 2004/0013437 A1 Jan. 22, 2004

(51) Int. Cl.[7] .................. H04B 10/04; H04B 10/00; H04J 14/02
(52) U.S. Cl. .................. 398/183; 398/79; 398/182; 398/118; 398/200
(58) Field of Search .................. 398/82, 182, 183, 398/186, 200, 79, 118

(56) References Cited

U.S. PATENT DOCUMENTS

| | | | | |
|---|---|---|---|---|
| 4,615,582 A | * | 10/1986 | Lefevre et al. ................ 385/4 |
| 4,633,079 A | | 12/1986 | Rieger | |
| 4,760,250 A | * | 7/1988 | Loeppert ............... 250/227.23 |
| 5,015,842 A | * | 5/1991 | Fradenburgh et al. . 250/227.15 |
| 5,166,993 A | * | 11/1992 | Blyler et al. ................. 385/31 |
| 5,250,805 A | * | 10/1993 | Park ..................... 250/237 G |
| 5,259,901 A | | 11/1993 | Davis et al. | |
| 5,278,687 A | * | 1/1994 | Jannson et al. ............... 398/79 |
| 5,457,557 A | * | 10/1995 | Zarem et al. ................ 398/116 |
| 5,515,469 A | | 5/1996 | Zarem et al. | |
| 5,650,612 A | * | 7/1997 | Criswell et al. ............ 250/226 |
| 5,796,502 A | * | 8/1998 | Haller, Jr. .................... 398/91 |
| 5,919,044 A | | 7/1999 | Sicurelli, Jr. et al. | |
| 6,114,632 A | * | 9/2000 | Planas et al. ........... 174/117 R |
| 6,160,649 A | * | 12/2000 | Horiuchi et al. ............. 398/34 |
| 6,275,250 B1 | * | 8/2001 | Sanders et al. ............ 347/247 |
| 6,313,465 B1 | | 11/2001 | Nittoh et al. | |
| 6,467,969 B1 | * | 10/2002 | Shmulovich ................. 385/54 |
| 6,614,982 B2 | * | 9/2003 | Barrett ...................... 385/140 |

FOREIGN PATENT DOCUMENTS

| | | | | |
|---|---|---|---|---|
| JP | 58-117508 | * | 7/1983 | ............ G02B/5/14 |
| WO | PCT/US03/22210 | | 7/2003 | |

* cited by examiner

*Primary Examiner*—M. R. Sedighian
(74) *Attorney, Agent, or Firm*—Blakely Sokoloff Taylor & Zafman LLP

(57) ABSTRACT

An apparatus and method for combining multiple optical beams into mode-scrambled optical signals. In one embodiment, the apparatus includes a plurality of laser beam sources, each to produce a modulated optical beam. A plurality of input fiber segments, each comprising a multimode optical fiber core, are operatively coupled at one end to a respective laser source to receive a respective modulated optical beam. A multimode optical beam combiner is used to operatively couple the output ends of the input fiber segments to the input end of an output fiber segment having a multimode optical fiber core. The modulated optical beams produced by the laser beam sources are combined into a single mode-scrambled optical signal. The apparatus enables multiple optical beams having similar wavelengths to be combined to increase optical signal strength. It also enables multiple optical beams having different wavelengths to be combined to form a wavelength division multiplexed signal.

47 Claims, 14 Drawing Sheets

APPARATUS AND METHOD FOR COMBINING MULTIPLE OPTICAL BEAMS IN A FREE-SPACE OPTICAL COMMUNICATIONS SYSTEM

BACKGROUND OF THE INVENTION

1. Field of the Invention

The present invention generally relates to free-space optical (FSO) communications systems, and, more specifically, to an apparatus and method for efficiently combining a plurality of single-mode or multi-mode fiber-coupled optical beams into single fiber-coupled multimode optical beam.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or fibers between locations. Wireless optical communications are also known as free-space optical (FSO) or atmospheric optical communications. In a typical free-space optical communication system, a modulated beam of light is directed through free-space from a transmitter at a first location to a receiver at a second location. Data or information is encoded into the beam of light by means of the modulation. Once collected by the receiver, the modulated beam of light is demodulated and corresponding data and information may then be extracted. This scheme enables data and information to be transmitted through free-space from the first location to the second location.

In some instances, it is desired to provide redundant FSO systems to maintain uptime in the event of a component failure. One conventional approach is to provide two or more duplicate FSO communication channels, wherein the sending and receiving terminals include separate laser sources, modulator electronics, transmission optics, receive optics, and demodulators for each channel. In such configurations, instances of the same data stream are concurrently transferred between the sending and receiving terminals. This is a very costly approach, however.

Another desire is to increase the bandwidth between terminals in an FSO installation. One approach is to use multiple separate channels using a configuration similar to that described above for the conventional redundant FSO system. As before, this approach is costly.

Another approach is to use wavelength division multiplexed (WDM) optical signals. In this instance, a plurality of multiplexed optical signals are superimposed on one another and transmitted via a single modulated beam comprising a plurality of wavelengths, wherein each multiplexed optical signal has a separate wavelength. A primary requirement in WDM systems is a means for combining multiple optical signals into a single beam. One conventional approach is to use a multiple-IN/single-OUT star-coupler just before a transmit aperture, with one or more high-power amplifiers at an input side of the coupler being used to amplify the signals that are input into the coupler. However, use of such a coupler results in significant power loss on the output side of the coupler. For example, a 4-to-1 coupler results in a 6-dB (or ¾) drop in power, after amplification. Thus, a large portion of the amplification is lost via the coupler.

Another means for combining optical signals comprises a high density chip-to-chip optical interconnection based on a microelectromechanical (MEMS) device, as disclosed in an article entitled, "Design and Analysis of Micromechanical Tunable Interferometers for WDM Free-Space Optical Interconnection," published in *Journal of Lightwave Technology*, Volume 17, Issue 1. Channel connection is made by wavelength matching between tunable light sources and detectors using micromechanical Fabry-Perot interferometers. Under this scheme, an arbitrary number of incoming optical signals can be combined into a single outgoing signal. A significant drawback of this scheme is that it only supports optical signals with very low power levels.

SUMMARY OF THE INVENTION

In accordance with aspects of the present invention, apparatus' and methods for combining multiple optical beams to produce mode-scrambled optical signals are disclosed. In one embodiment, the apparatus includes a plurality of laser beam sources, each to produce a modulated optical beam. A plurality of input fiber segments, each comprising a multimode optical fiber core, are operatively coupled at one end to a respective laser beam source. A multimode optical beam combiner is used to operatively couple the output ends of each of the input fiber segments to the input end of an output fiber segment. The modulated optical beams produced by the laser beam sources are combined into a single, mode-scrambled optical signal comprising one or more wavelengths, depending on the implementation. The apparatus enables multiple optical beams having similar wavelengths to be combined to increase the power level of the optical signal. It also enables multiple optical beams having different wavelengths to be combined to form a wavelength division multiplexed (WDM) signal. The mode-scrambled optical signals are particularly well-suited for use in free-space optical communications systems.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
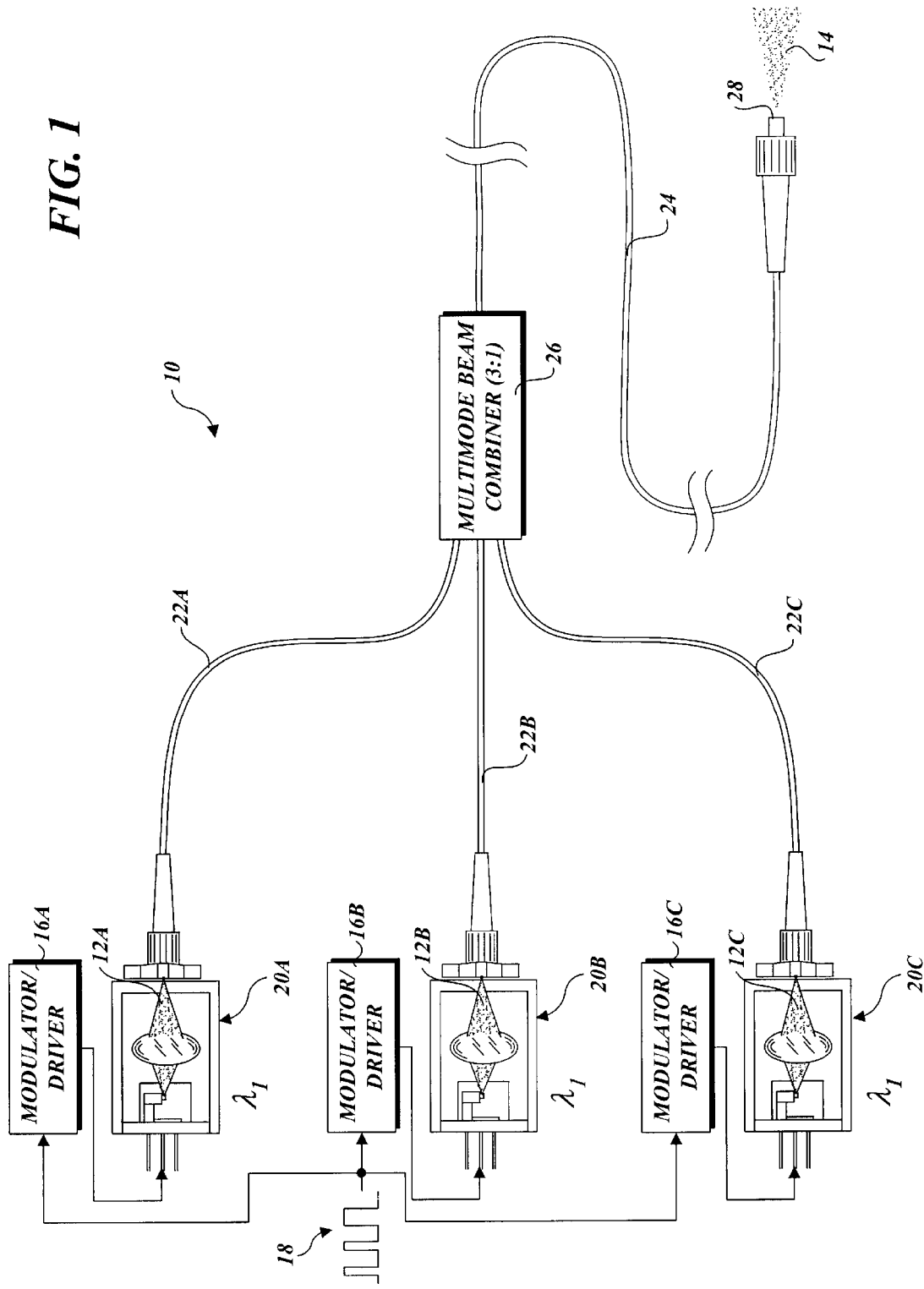
FIG. 1 is a schematic drawing of an apparatus for producing a mode-scrambled optical signal by combining a plurality of redundant optical signals in accordance with one embodiment of the invention.

Embodiments of apparatus and method for generating combined multimode optical signals are described herein. In the following description, numerous specific details are disclosed to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following paragraphs various embodiments of the invention are described with reference to the Figures contained herein. In general, components having the same base reference numerals in the Figures provide similar operations in each embodiment in which they are used. Additionally, as used herein, the term "fiber" will generally refer to optical fiber, and the terms fiber and optical fiber are used interchangeably.

In accordance with one aspect of the invention, various configurations are disclosed herein that enable a plurality of redundant optical signals to be combined into a single signal and transmitted to a receiving terminal via an FSO link. For example, an embodiment 10 shown in FIG. 1 enables three optical signals 12A, 12B, and 12C corresponding to there redundant channels A, B, and C to be combined into a single mode-scrambled optical signal 14, which then may be transmitted using appropriate optics (not shown) to a receiving terminal (not shown) at the other end of an FSO link. Each channel A, B, and C includes a respective modulator/driver 16A, 16B, and 16C that receives a common input data stream 18 as an input and generates a corresponding modulate drive current that is used to drive a laser diode in a respective laser beam source 20A, 20B, and 20C. Optionally, a single multi-channel modulator/driver may be used in place of the individual modulator drivers. The laser beam sources generate respective optical signals 12A, 12B, and 12C in response to their input drive currents, which are directed toward the free ends of respective input multimode optical fiber segments 22A, 22B, and 22C. The other ends of input fiber segments 22A–C are operatively coupled into a single output fiber segment 24 via a multimode beam combiner 26. The multimode beam combiner combines optical signals 12A, 12B, and 12C into a single optical signal that exits a free end 28 of fiber segment 24 as mode-scrambled optical signal 14.

In one embodiment, each of input fiber segments 22A–C comprise fiber having a graded-index (GI) multimode fiber core. In one embodiment, output fiber segment 24 comprises a step-index (SI) multimode fiber core. In one embodiment, input fiber segments 22A–C comprise a 62.5 micrometer (micron or $\mu$m) GI core, while output fiber segment 24 comprises a 200 $\mu$m SI core, with both fibers having the same numerical aperture. To minimize coupling losses, the core diameters of the input fiber segments 22A–C should be sized and the input fibers configured such that the entire core of each input fiber segment fits within the core diameter of output fiber segment 24. Furthermore the numerical aperture of the input fiber should be less than or equal to the numerical aperture of the output fiber.

In addition to the illustrated embodiments, configurations using different input and output core sizes and numbers may be implemented in accordance with the principles of the invention. For example, the input fibers may have 50 $\mu$m GI cores. Similarly, the output fiber may have 300 or 400 $\mu$m SI cores. In general the number of input fibers used may correspond to the illustrated embodiments (three and seven), or any other number that can be reasonably packed into the input geometry (i.e., diameter) of the output fiber core.

In general, laser sources 20A, 20B, and 20C will produce synchronized optical signals having similar wavelengths $\lambda_1$. For example, typical wavelengths for $\lambda_1$ include any of the following regions: 785 nm (e.g., 782, 785, 786, 790 nm), 850 nm (e.g., 845, 848, 850, 855), 980 nm, 1550 nm. Generally, the wavelengths do not need to be tightly controlled with respect to one another. Accordingly, since each of optical signals 12A–C corresponding to the same input data stream and are at approximately the same wavelength, these optical signals comprise redundant signals that are combined into a single optical signal having a power level that is substantially the sum of the power levels of the individual signals alone. Thus, one benefit of using such combined redundant signals is that it enables the link distances between FSO terminals to be increased as a result of the increased power level in the combined signal. Another aspect of the redundancy configuration is that it enables a single optical signal to fail without having the link fail.

Figure 2:
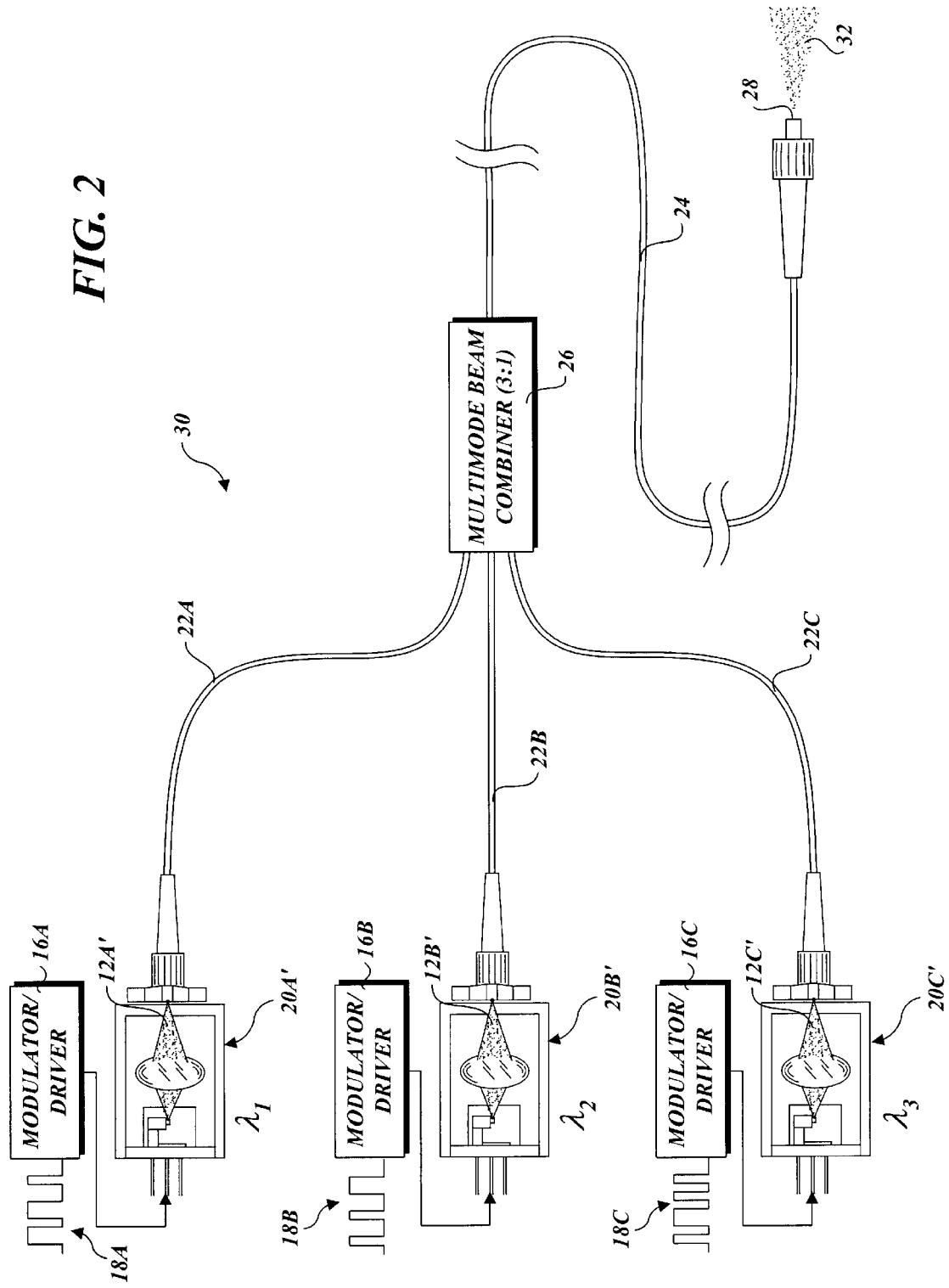
FIG. 2 is a schematic drawing of an apparatus for producing a mode-scrambled wavelength division multiplexed (WDM) optical signal by combining a plurality of optical signals having different wavelengths in accordance with one embodiment of the invention.

An embodiment 30 that enables data pertaining to multiple independent data streams 18A, 18B, and 18C to be transmitted simultaneously via a wavelength division multiplexed (WDM) signal 32 is shown in FIG. 2. In this configuration, each of independent data streams 18A, 18B, and 18C is received by a respective modulator/driver 16A, 16B, and 16C. The modulator/drivers, in turn, provide modulated currents to drive respective laser diodes in laser sources 20A', 20B' and 20C' to produce respective optical signals 12A', 12B', and 12C'. Each of optical signals 12A', 12B', and 12C' has a separate wavelength, as depicted by wavelengths $\lambda_1$, $\lambda_2$, and $\lambda_3$.

By using multiple modulated signals having respective wavelengths, the bandwidths of each of the individual signals can be aggregated, thereby increasing the bandwidth of an FSO link. Generally, the wavelength spacing should meet that prescribed for Course Wavelength Division Multiplexing (CWDM), i.e., near 1550 nanometers (nm) with a nominal 20 nm spacing: 1490, 1510, 1530, 1550, 1570, 1590, 1610 . . . , or that prescribed for Dense Wavelength Division Multiplexing (DWDM). Under DWDM, the wavelength separation corresponds to an ITU 100 GHz grid. For example, an exemplary set of DWDM wavelengths are shown below in TABLE 1.

TABLE 1

| wavelength (nm) | frequency (THz) | frequency (GHz) |
| --- | --- | --- |
| 1569.59 | 191.0 | 191000 |
| . . . | . . . | |
| 1553.33 | 193.0 | 193000 |
| 1552.52 | 193.1 | 193100 |
| 1551.72 | 193.2 | 193200 |
| 1550.92 | 193.3 | 193300 |
| . . . | . . . | |
| 1529.55 | 196.0 | 196000 |

Figure 3:
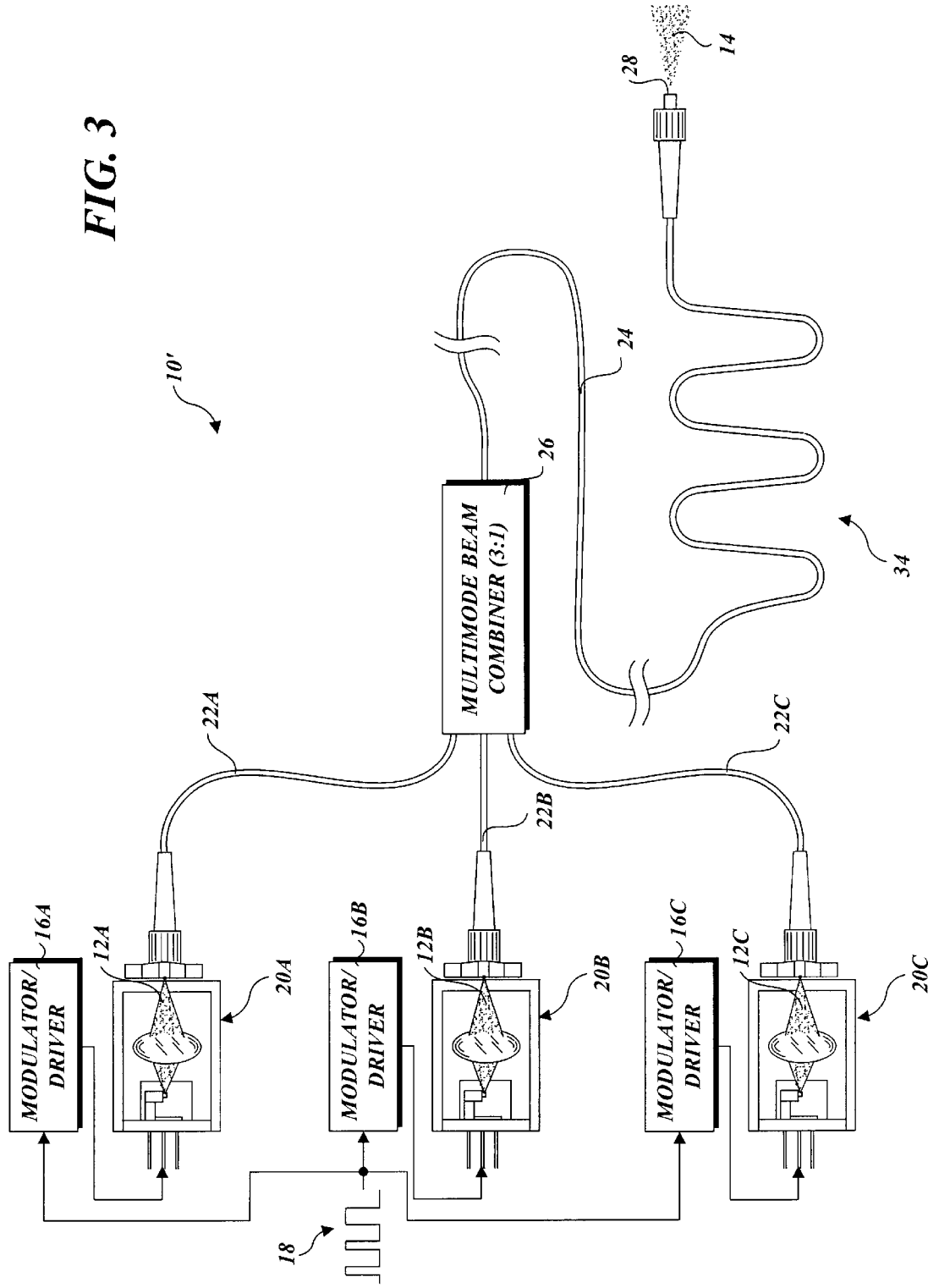
FIG. 3 is a schematic drawing illustrating a variant of the apparatus of FIG. 1, wherein a portion of an output fiber segment is configured in a series of alternating loops in accordance with one embodiment of the invention.

An embodiment 10', which is a variant of embodiment 10, is shown in FIG. 3. In this embodiment, a portion of output fiber segment 24 is configured in a series of alternating loops 34. It is noted that the final segment of multimode fiber may be configured in a similar series of alternating loops for each of the embodiments discussed herein, and that FIG. 3 is merely representative of a particular implementation corresponding to embodiment 10. Experimental results have shown that the use of such alternating loops improves the mode scrambling of a mode-scrambled optical signal in which the outer portions of the numerical apertures of the signal are more filled.

Figure 4:
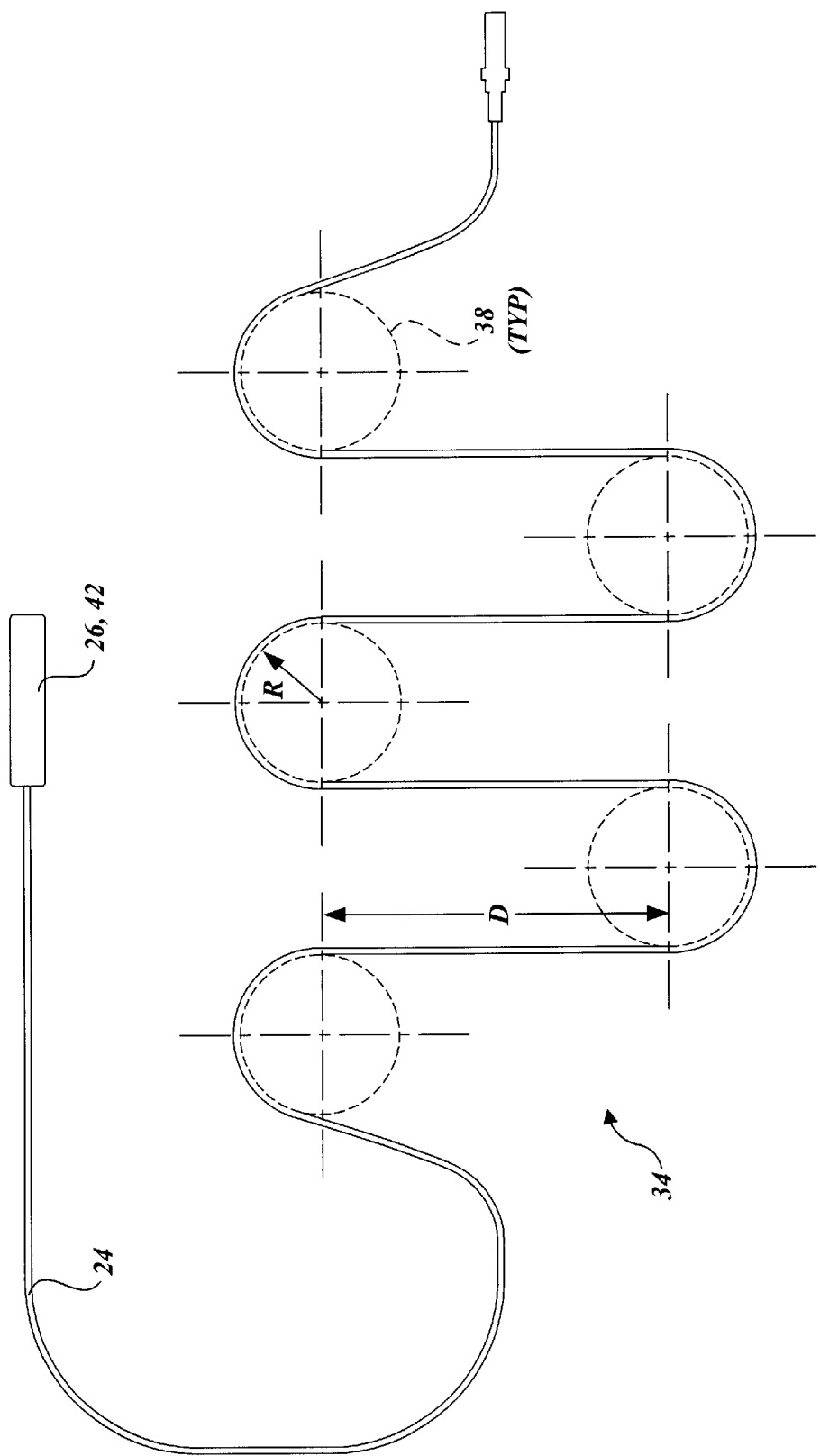
FIG. 4 is a schematic detail drawing illustrating further details of the series of alternating loops in accordance with one embodiment of the invention.

Details of alternating loops 34 in accordance with one embodiment are shown in FIG. 4. In this embodiment, the alternating loops may be formed by wrapping a portion of output fiber segment 24 around a plurality of rods 38 in an alternating manner. In general, the radius R of the loops should be large enough to not cause damage to the fiber. In one embodiment, the rods have a diameter of about ½ inch. Additionally, the horizontal distance D between adjacent rods is generally not critical.

Figure 5:
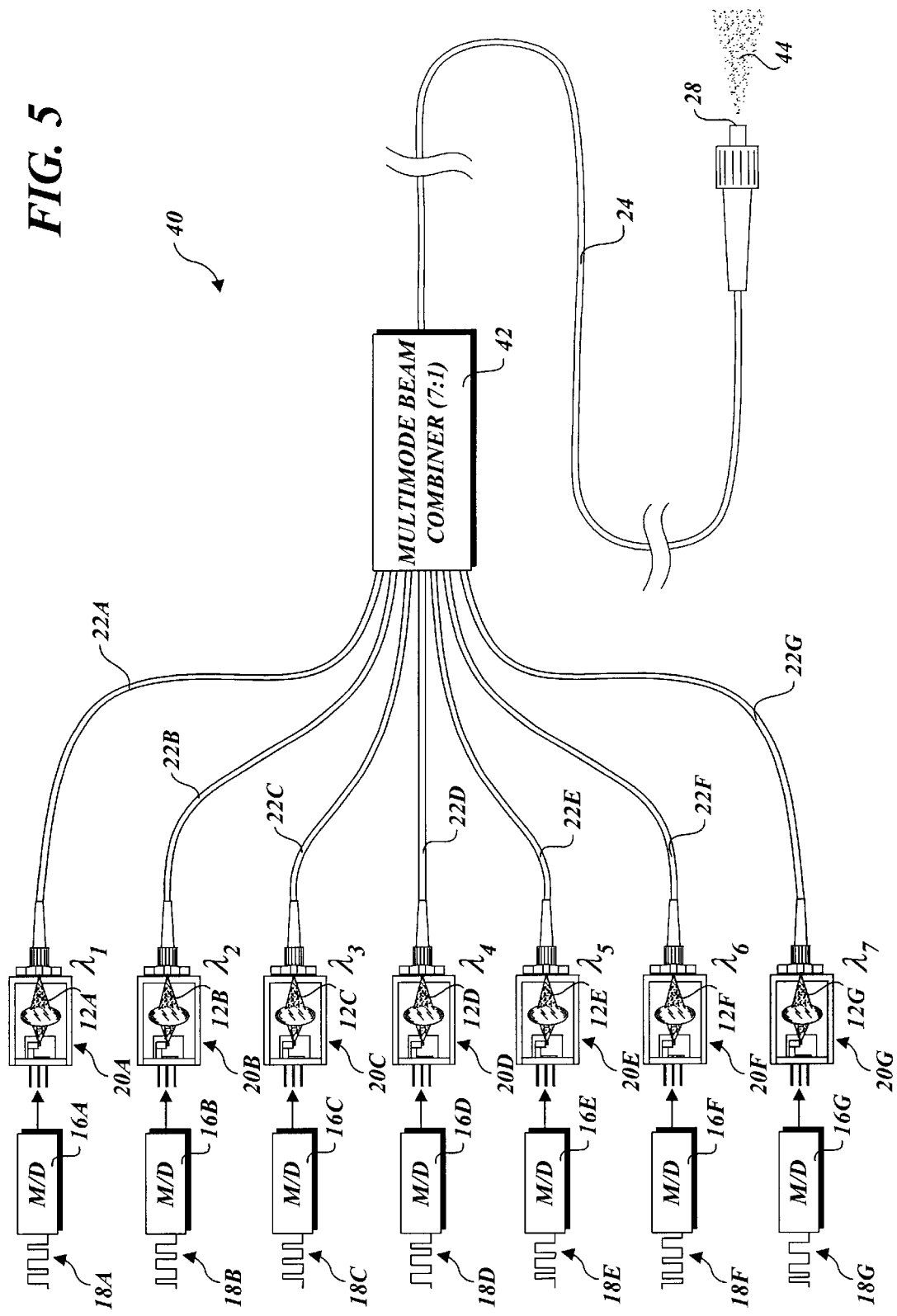
FIG. 5 is a schematic diagram of an apparatus for producing a mode-scrambled WDM optical signal by combining seven input optical signals having different wavelengths.

A multi-channel beam combiner configuration 40 having characteristics similar to embodiment 30, but implementing seven rather than three channels, is shown in FIG. 5. In the illustrated embodiment, configuration 40 includes seven independent optical signals 12A, 12B, 12C, 12D, 12E, 12F, and 12G, which are combined via a 7:1 multimode beam combiner 42 into a WDM optical signal 44 having seven respective wavelengths. In another embodiment, the optical signals corresponding to two or more channels may be redundant. For example, Channels A and B may share a common input data stream and produce optical signals having similar wavelengths. Similarly, other channels may also be used to support redundant configurations, including using three or more redundant channels or using redundant channel pairs and/or channel triplets. There also may be instances in which a portion of the channels are redundant, while other channels are independent. Furthermore, one or more of the channels may be used for non-data channel purposes, such as quality of service (QOS) operations to determine if and when an FSO link should be switched between primary and backup channels.

Figure 6:
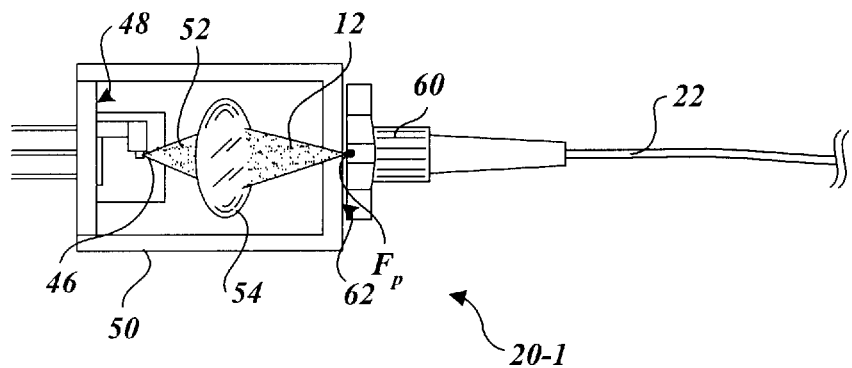
FIG. 6 is a schematic diagram of a laser beam source in accordance with one embodiment of the invention.

In general, laser beam sources 20n may comprise one of many types of laser beam sources that can produce a modulated laser beam suitable for use in FSO optical signals. For example, a first embodiment 20-1 of laser beam source 20n is shown in FIG. 6. Laser beam source 20-1 includes a laser diode 46 mounted to a first face 48 of a housing 50. Laser diode 46 emits laser light 52, which is received by a focusing optical component 54. In one embodiment, focusing optical component 54 comprises a single optical lens. In another embodiment, as illustrated below in FIG. 9, focusing optical component 54 comprises a set of optical lenses. In either case, the single or set of optical lenses is/are operatively coupled to housing 50 such that focusing optical component 54 is held in a fixed relationship to laser diode 46.

Figure 7:
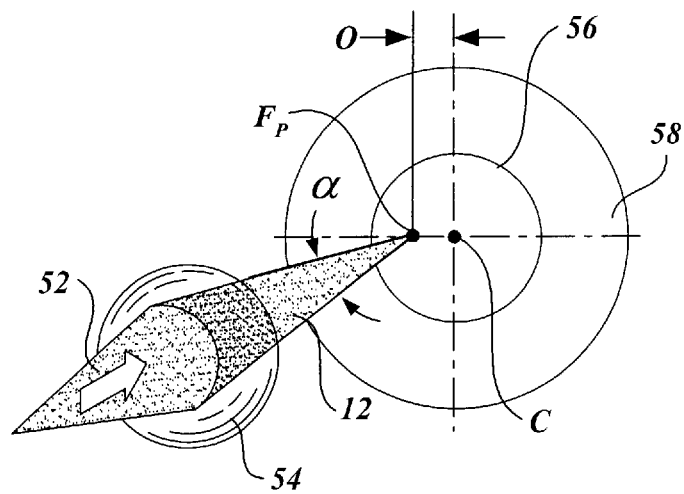
FIG. 7 is a schematic diagram illustrating details of an offset launch condition wherein a modulated optical beam is directed toward a free end of a multimode fiber core at an offset from the center of the multimode fiber core.

As further shown in FIG. 7, laser diode 46 and focusing optical component 54 are configured in a manner that results in an optical beam 12 being directed toward a focal point $F_p$ that is substantially coincident with the end of a fiber core 56 of input fiber segment 22 and offset from a centerline C of the fiber core by an offset distance O. This generates an offset-launched optical signal that is received at the end of the fiber core. In one embodiment, focusing optical component 54 is configured such that a convergence angle $\alpha$ of optical beam 12 substantially matches the numerical aperture of fiber core 56.

As further depicted in FIG. 7, fiber core 56 is surrounded by cladding 58. In typical fibers, the fiber cladding is generally surrounded by a protective jacket, made of materials such as polymers. For illustrative purposes, the fiber core, cladding, and protective jacket are shown as a single structure in several of the Figures contained herein for clarity. In other Figures, the protective jacket is not shown for clarity.

In one embodiment, an end portion of input fiber segment 22 is held in a fiber mount 60, which is mounted to an end face 62 of housing 50 such that focal point $F_p$ is substantially coincident with the end of fiber core 56. In general, any suitable means for fixedly mounting the end of fiber core 56 such that it is substantially coincident with focal point $F_p$ may be used.

Figure 8:
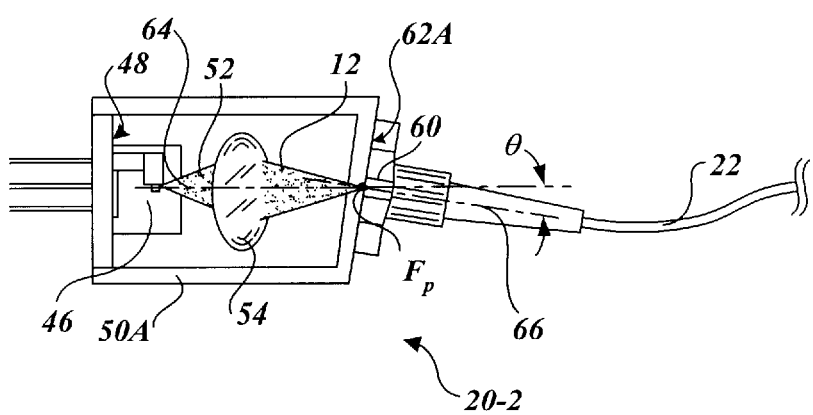
FIG. 8 is a schematic diagram of a laser beam source in which a modulated optical beam is directed at an acute angle relative to a centerline of an input fiber segment it is launched into in accordance with one embodiment of the invention.

A laser beam source 20-2 in accordance with another embodiment of the invention is shown in FIG. 8. In this configuration, light beam 12 is directed into fiber core 56 such that an acute angle $\theta$ is formed between respective centerlines 64 and 66 of the optical beam and end portion of fiber core 56. The remaining components of laser beam source 20-2 are substantially similar to like-numbered components discussed above with reference to laser beam source 20-1. In the embodiment illustrated in FIG. 8, an end face 62A of a housing 50A is angled relative to centerline 64 such that it forms an angle of 90°-$\theta$ to the free end of input fiber segment 22. As further illustrated in FIG. 8, an angle $\theta$ between centerlines 64 and 66 is created upon mounting fiber mount 60 to end face 62A. An alternative configuration that produces similar results is described below with reference to FIG. 9.

The primary purpose of creating an acute angle between centerlines 64 and 66 is to substantially eliminate any portion of light impinging on the end of fiber core 56 from being reflected back toward laser diode 46. Since free space optical signals comprise a laser beam modulated at very high frequencies, it is desirable to minimize any signal degradation that might result from the reflected light generating spurious optical modes in laser.

Figure 9:
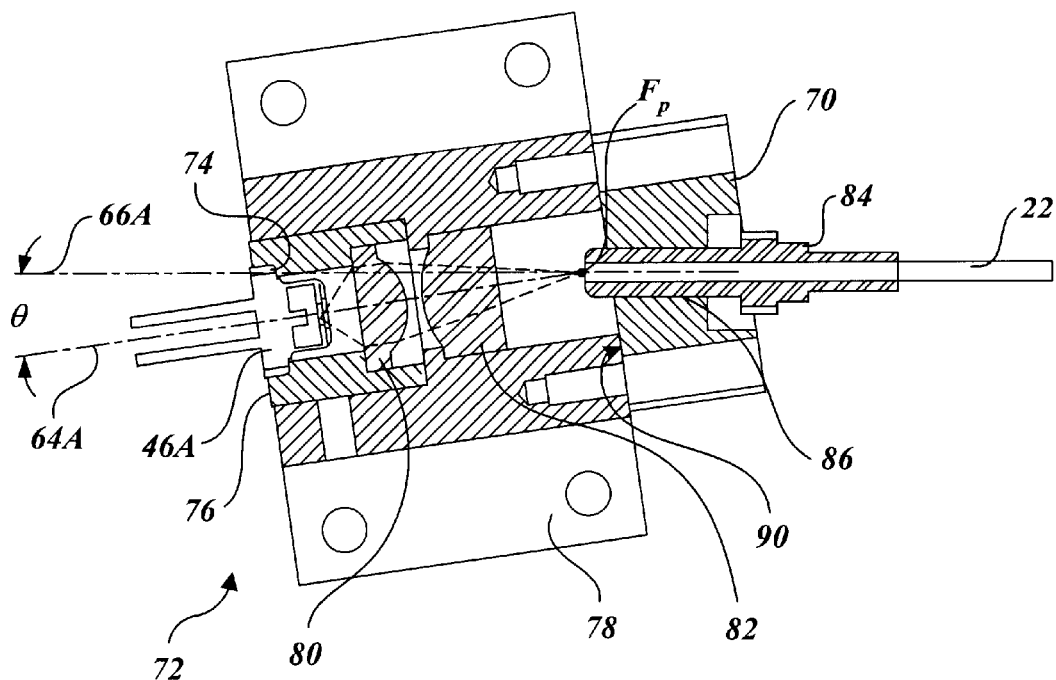
FIG. 9 shows a cross-section detail of another embodiment of a laser beam source that may be employed to produce a similar launch condition to the embodiment of FIG. 8.

Details of an offset fiber mount 70 that is coupled to a laser beam source 72 are shown in FIG. 9. Laser beam source 72 includes a laser diode 46A that is mounted in a recess 74 defined in a first end face 76 of a housing 78. Laser light emitted from laser diode 46A is collimated by a collimating lens 80 and received by a focusing lens 82, which directs the laser light substantially along a centerline 64A toward a focal point $F_p$. An end portion of input fiber segment 22 is mounted within a ferrule 84 having a head portion disposed within a counterbored hole 86. Counterbored hole 86 is formed such that its centerline (coincident with a centerline 66A of an end portion of input fiber segment 22) forms a relative angle of 90-θ between the centerline and a face 90 of offset fiber mount 70.

Various views of a 3:1 multimode beam combiner 26 in accordance with one embodiment of the invention are shown in FIGS. 10A–D. As depicted in these Figures, each of multimode fibers 22n includes a 62.5 μm fiber core 56 surrounded by a 125 μm cladding 58, while multimode fiber 24 includes a 200 μm fiber core 102 surrounded by 220 μm cladding 104. (It is noted that a portion of cladding 104 is shown as stripped away from fiber core 102 in FIGS. 10A, 10B, and 10D to illustrate the structure of multimode fiber 24; in an actual application the cladding would not be stripped away.)

Figure 10A:
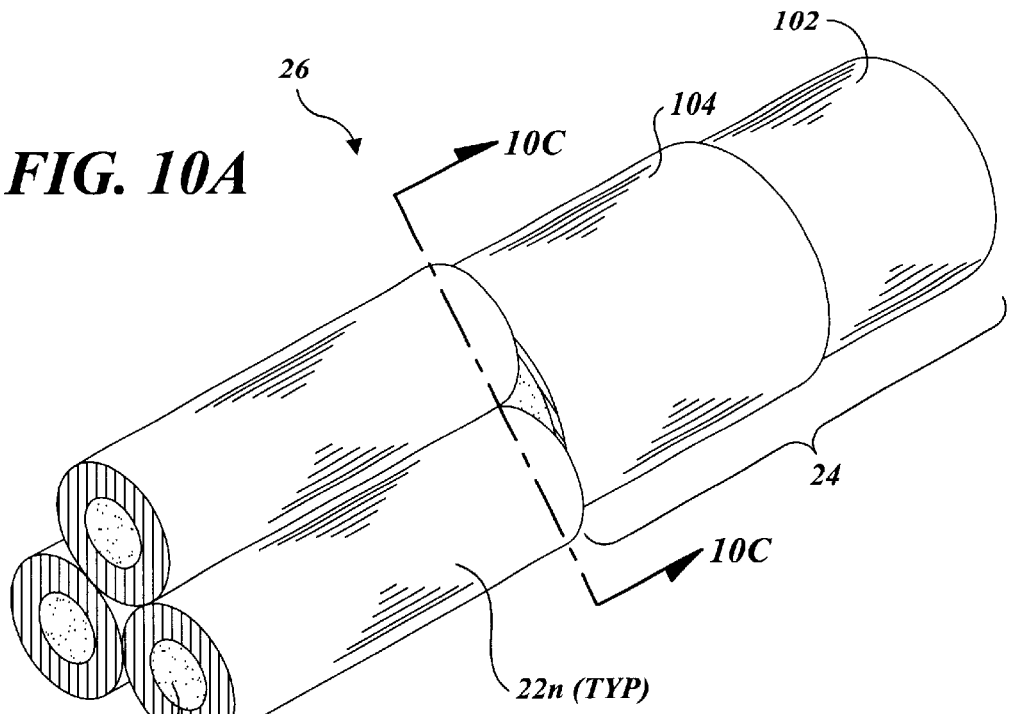
FIGS. 10A–10D comprise various views of a multimode optical beam combiner that enables three input optical signals to be combined into a single output signal in accordance with one embodiment of the invention.
Figure 10B:
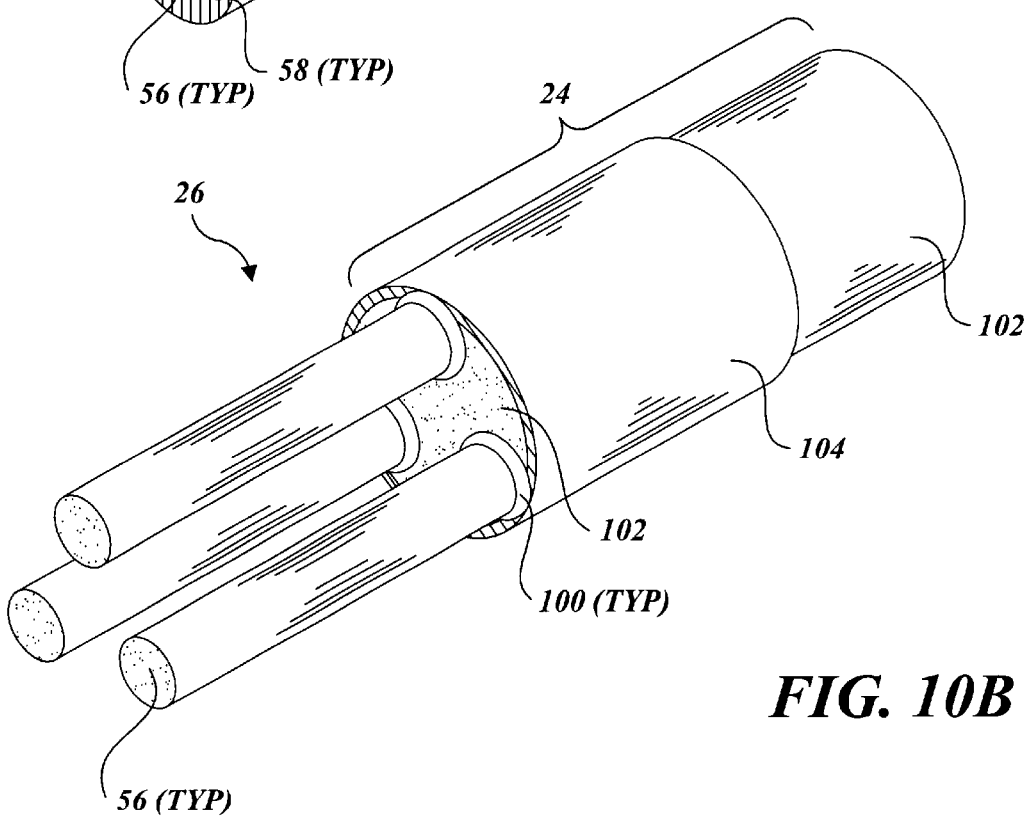
Figure 10C:
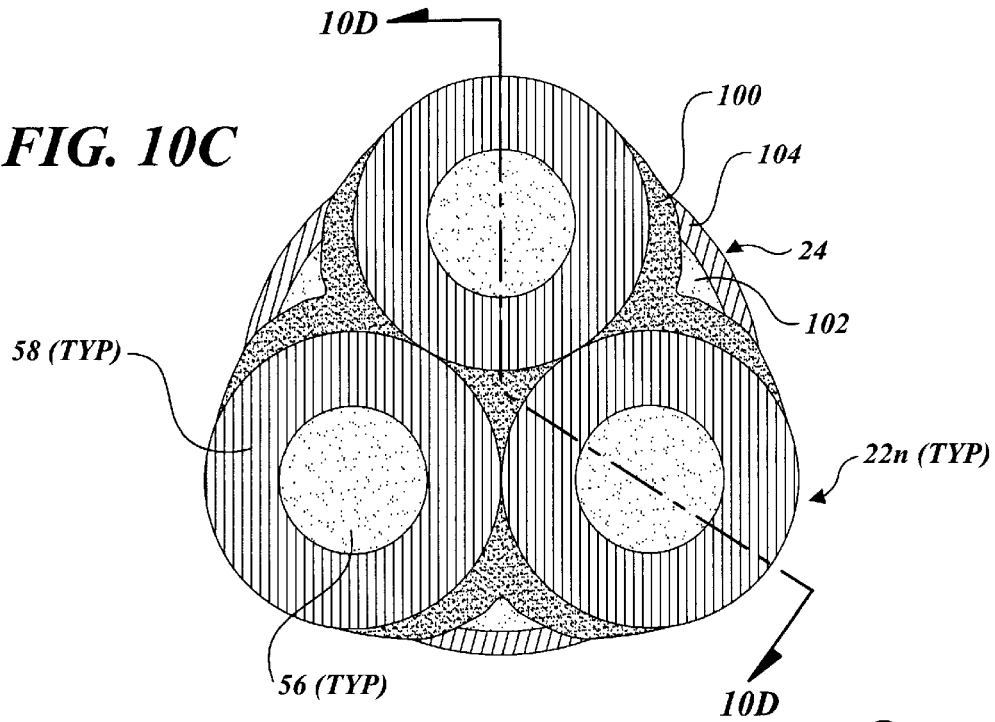
Figure 10D:
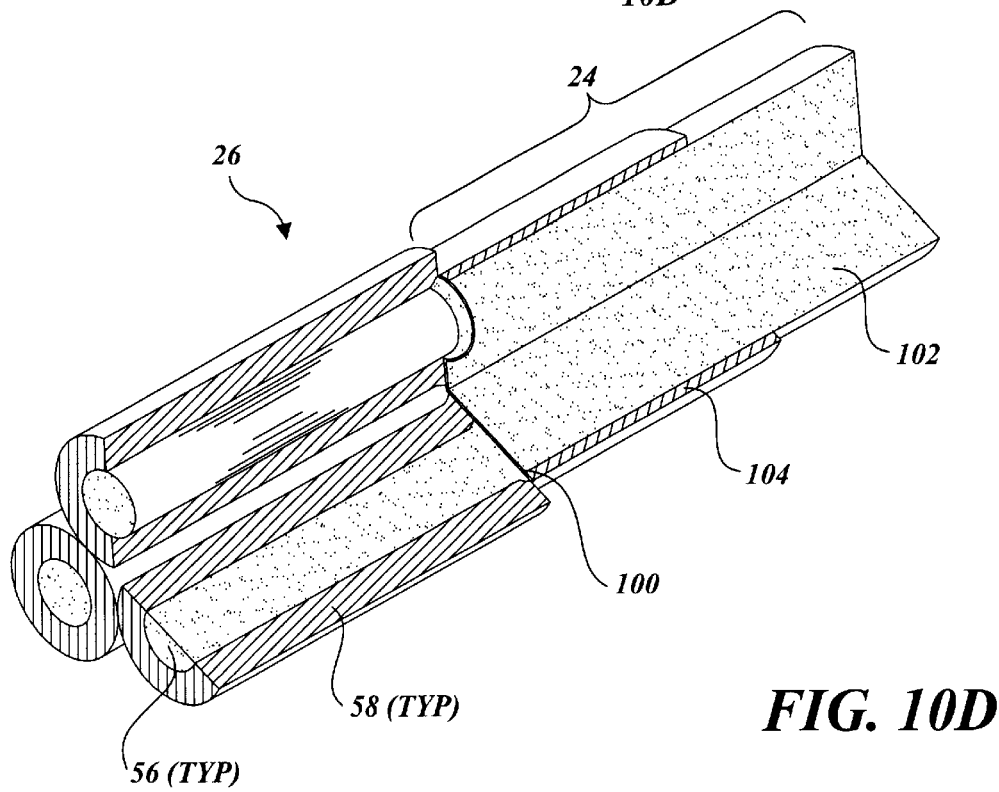

In one embodiment, multimode beam combiner 26 uses a fusion splice 100 to couple the ends of three multimode fibers 22 to one end of an output fiber segment 24. The fusion splice is formed by stripping back the jacketing on the end portions of the fibers (jacketing not shown), cleaving the ends of the fibers and applying heat or an arc current while holding the ends of the fibers together until they melt into one another. In general, fusion splicing may be facilitated by equipment designed for such purposes, examples of which include fusion splice equipment manufactured by Ericsson and Fujikura. Since both the fiber cores 56 and cladding 58 of input fiber segments 22n and fiber core 102, and cladding 104 of output fiber segment 24 comprise silicon having substantially the same melting point, both the cores and the cladding of the fiber segments melt into one another (locally), as depicted in FIGS. 10C and 10D (exaggerated for clarity).

Figures 11A, 11B:
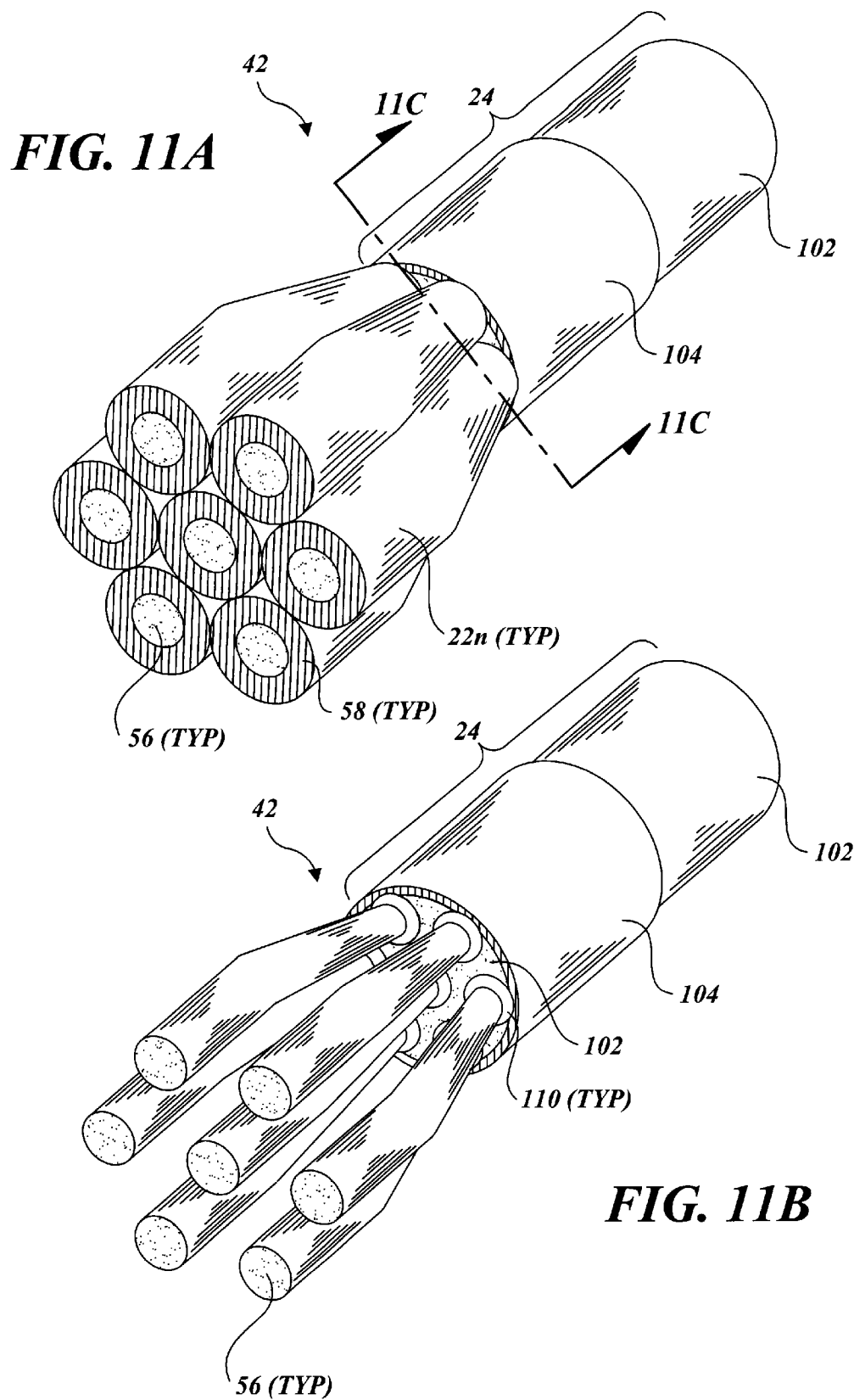
FIGS. 11A–11D comprise various views of a multimode optical beam combiner that enables seven input optical signals to be combined into a single output signal in accordance with one embodiment of the invention.
Figure 11C:
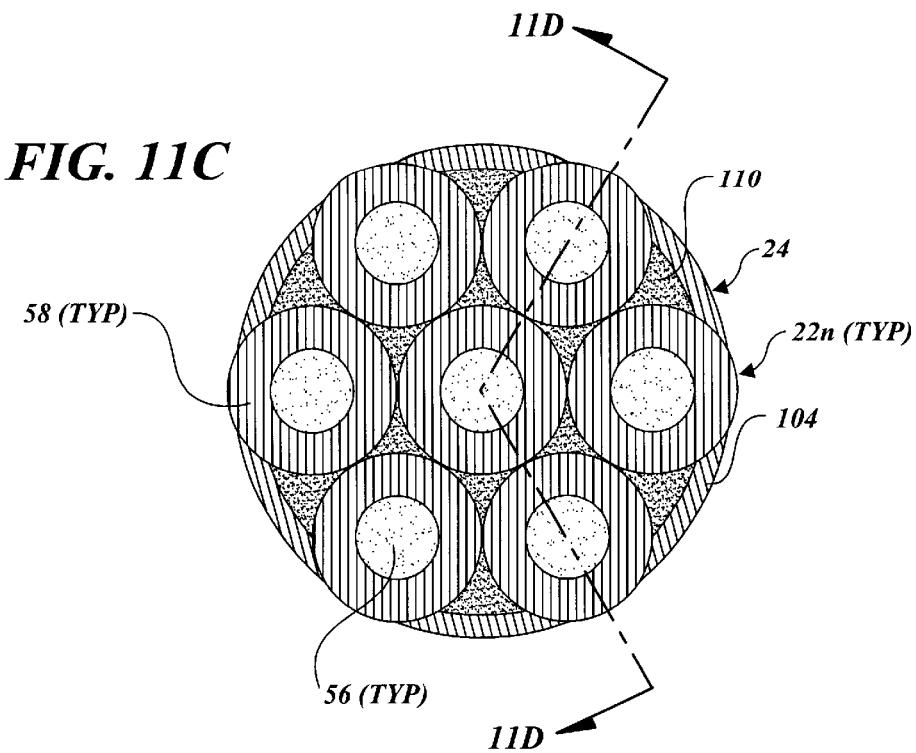
Figure 11D:
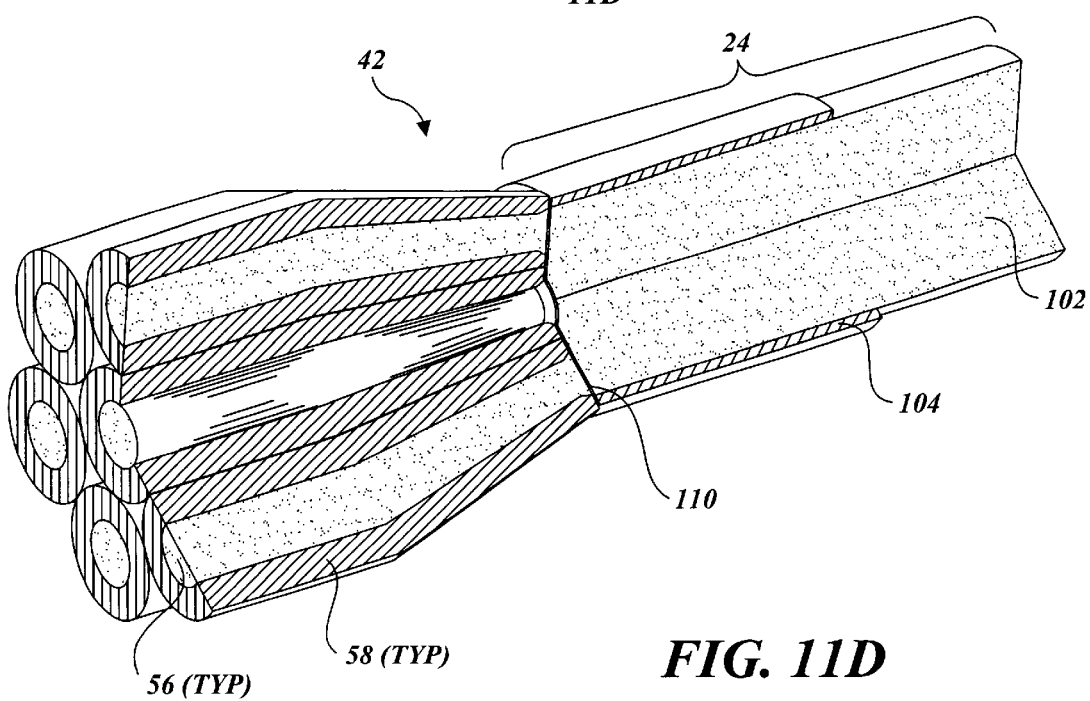

A 7:1 multimode beam combiner 42 incorporating a fusion splice 110 formed by a similar operation is shown in FIGS. 11A–11D. Again, in the illustrated embodiment each of multimode fibers 22n includes a 62.5 μm fiber core 56 surrounded by a 125 μm cladding 58, while multimode fiber 24 includes a 200 μm fiber core 102 surrounded by 220 μm cladding 104. In this instance, it is first necessary to reduce the cross section of fiber cores 56 and cladding 58 at the ends of multimode fibers 22n prior to fusing the ends to the end of multimode fiber 24. Accordingly, in one embodiment, end portions of input fiber segments 22n are heated and drawn to produce a tapered configuration, as illustrated in FIGS. 11A, 11B, and 11D (exaggerated for clarity). In one embodiment, the nominal diameters of fiber cores 56 and cladding 58 respectively comprise 62.5 μm and 125 μm, which are reduced to approximately 37 μm and 75 μm, respectively, at their tapered ends. As mentioned earlier, the numerical apertures of the input fiber segments must be substantially the same as the output segment. As a fiber is tapered and its core size reduces, its numerical aperture will increase. Therefore, if the input fiber cores are reduced by a factor of two, the initial numerical aperture (before tapering) should be approximately one half the desired numerical aperture at the interface between the input fibers and the output fiber.

Experimental results have shown the coupling between the segments of fibers produced by the fusion splice is such that there is substantially no loss in signal strength as an optical signal passes through the fusion splice. Additionally, in the embodiments in which input fiber segments 22n have 62.5 μm core GI fiber and output fiber segment 24 has a 200 μm core SI fiber, experimental results have shown substantial mode scrambling of the optical signal is produced. Furthermore, the use of the offset launch condition and alternating loops produces even further mode scrambling, such that the numerical aperture of the optical signal that exits output fiber segment 24 is substantially filled.

VCSEL Embodiments

According to one aspect of the invention, an array of high-speed vertical cavity surface-emitting lasers (VCSELs) may be implemented for the laser beam sources. Generally, VCSELs are available in individual packages, or packaged in an array. One advantage of VCSEL arrays is that they are manufactured using fabricated wafers that are made using processing that is similar to that used for manufacturing integrated circuit components. As a result, VCSELs exhibit very predictable performance characteristics. VCSELs may also be tested while on the original wafer, unlike ordinary laser diodes, which typically must be diced, mounted and wire bonded before they can be tested.

Figure 13:
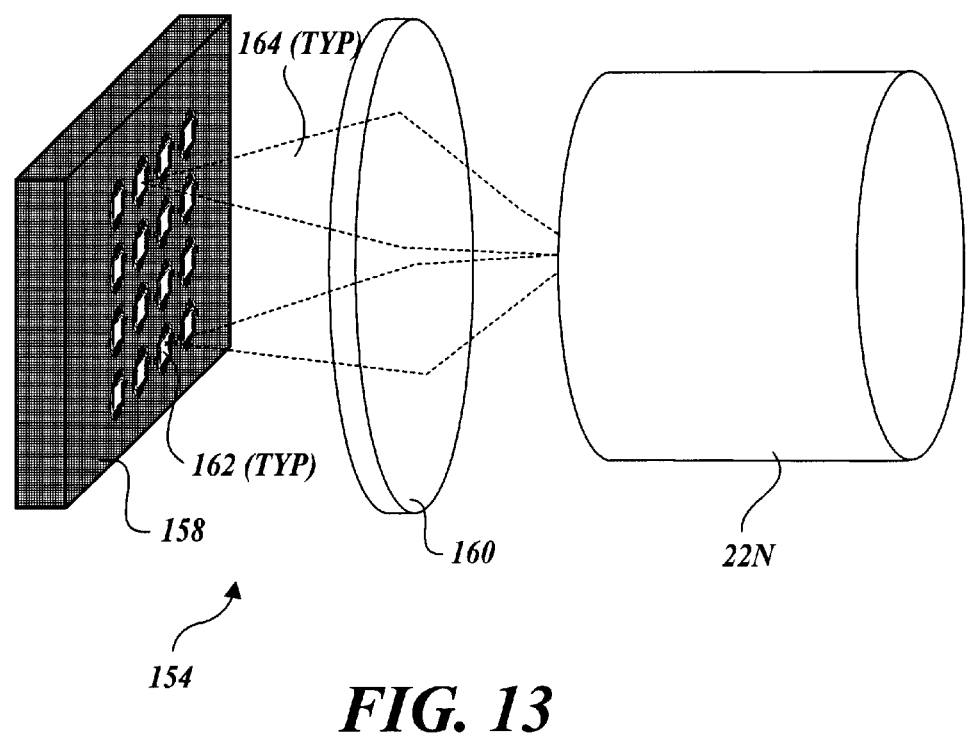
FIG. 13 is a schematic diagram illustrating details of a VCSEL optical assembly in accordance with one embodiment of the invention.
Figure 12:
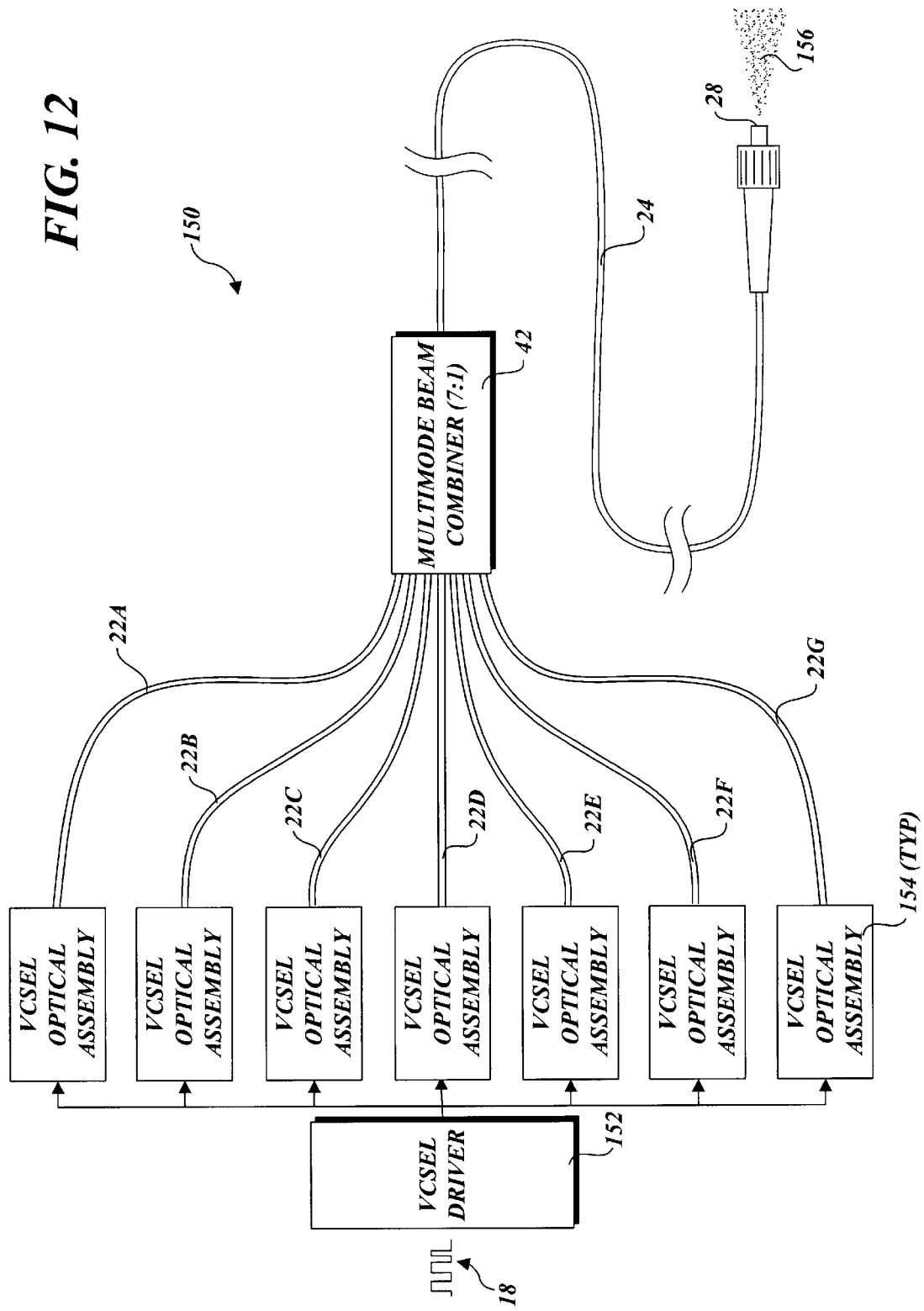
FIG. 12 is a schematic diagram of an apparatus for combining a plurality of optical signals generated by a VCSEL array.

In an embodiment 150 depicted in FIG. 12, a VCSEL driver 152 and a plurality of VCSEL optical assemblies 154 are used in place of modulator/drivers 16n and laser beam sources 20n of multi-channel beam combiner configuration 40, resulting in the generation of a mode-scrambled optical signal 156. As shown in FIG. 13, in one embodiment VCSEL optical assembly 154 includes a VCSEL array 158 and a lens 160. In general, VCSEL array 158 will include a plurality of VCSELs 162 arrayed in a N×1, N×N, and N×M configuration. As further shown in FIG. 13, each VCSEL 162 emits a modulated laser beam 164 that is received by lens 160 and directed into the end of a fiber 22n. In a manner similar to that described above, the laser beams received at the end of the fiber may be focused to impinge on the end of the fiber such that an offset launch condition is created.

In one embodiment, a portion of the VCSELs in the VCSEL arrays may be used a selective spares. For example, if one of the active VCSELs in the array fails, a spare VCSEL may be activated to take its place. In one embodiment, a portion of multimode fibers 22n are used to carry "spare" optical signals (i.e., optical signals generated by the spare VCSELs), and the configuration of the VSCEL optical assembly is similar to that shown in FIG. 13. In addition to using single lenses to obtain this objective, as illustrated, combination lenses and other optical components, such as mirrors, may also be used to achieve similar results. An advantage of such configurations is that all of input fiber segments 22n may be used to carry "active" optical signals.

Amplified Laser Source Embodiments

According to another aspect of the invention, one or more of laser sources, each followed by an optical amplifier, may be used to generate laser beams that are optically coupled into the input fiber segments. For example, in an EDFA embodiment 170 shown in FIG. 14, a plurality of Erbium-doped Fiber Amplifiers are used to amplify incoming optical signals produced by one or more laser sources. In the illustrated embodiment, a plurality of amplified laser beam sources 172A, 172B, and 172C generate respective modulated optical signals 174A, 174B, and 174C, which are received at the input ends of respective input fiber segments 22A, 22B, and 22C. As before, the light signals are combined by a 3:1 multimode beam combiner 26 into an output fiber segment 24 and emitted as a mode-scrambled optical signal 176.

Each amplified laser beam source 172n includes one or more laser diodes 178n that produce respective modulated light signals 180n in response to a drive signal produced by a modulator/driver 16n'. The light signals are received by an EDFA 182n, which amplifies the signals to produce a respective modulated optical signal 174n. In the illustrated embodiment, each set of modulated light signals 180A, 180B, and 180C input into the respective EDFAs 182n, have different wavelengths. Optionally, when a plurality of light sources provide input to a common optical amplifier, the wavelengths of the respective modulated light signals may differ. For example, as illustrated by a laser beam source 172' in FIG. 15, a plurality of modulator/drivers 16n'' generate drive signals based on respective data streams 18n that are used to drive respective laser diodes 178n'. In response to their drive signals, the laser diodes produce respective modulated light signals 180n' having respective wavelengths $\lambda_n$, which are received by an EDFA 182 and amplified to produce a modulated optical signal 174 that is optically coupled into a respective input fiber segment 22n (not shown). As yet another option, all of the wavelengths produced by a given set of laser diodes may be the same. As such, the laser diodes may operate as redundant light sources and/or primary/spare light sources. As with the VCSEL arrays discussed above, amplified laser sources 172n may be used as a laser source for any of the other configuration described herein, such as those illustrated in FIGS. 3 and 5.

Figure 14:
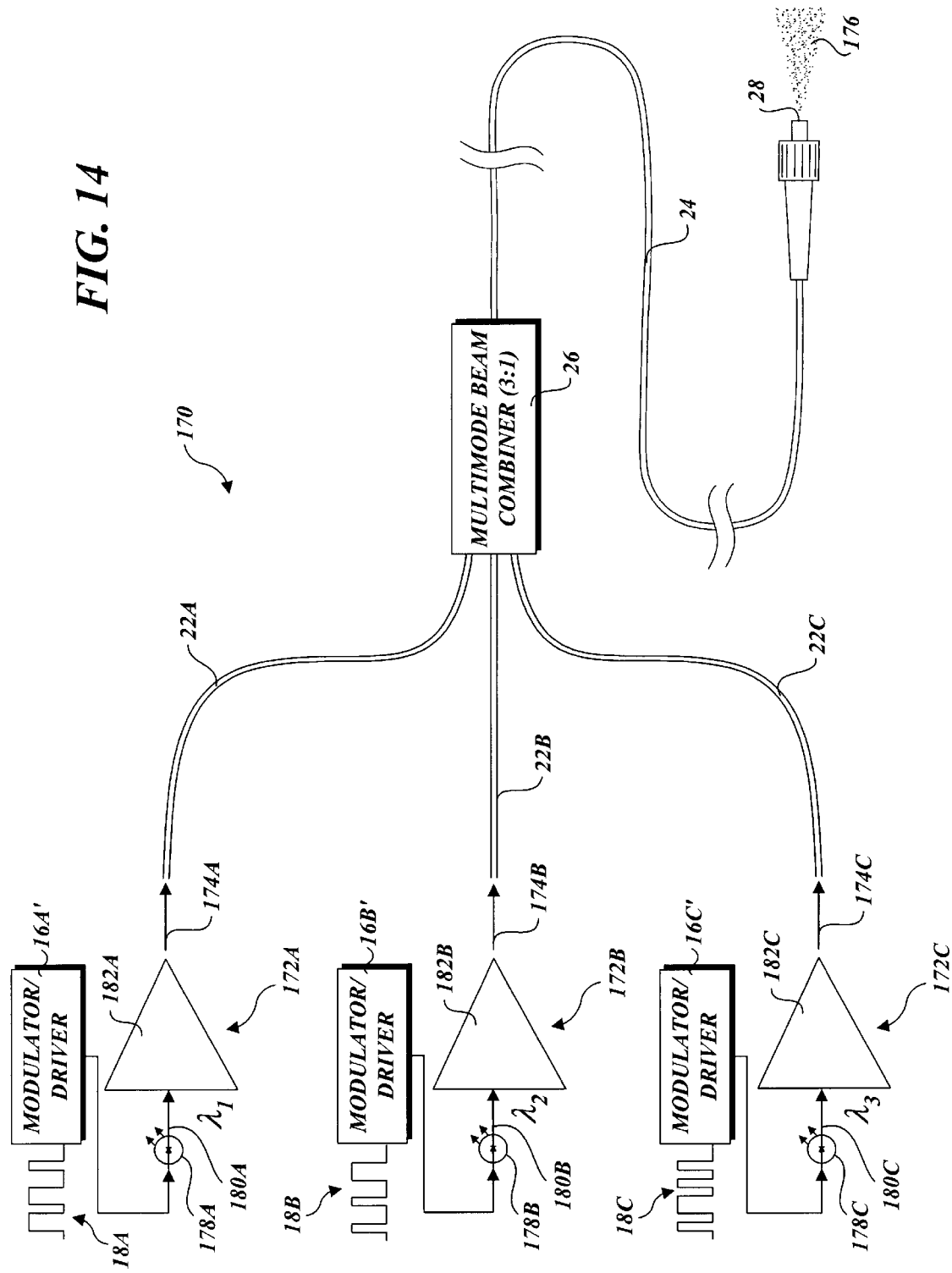
FIG. 14 is a schematic diagram of an apparatus for combining a plurality of optical signals generated by laser beam sources that employ Erbium-doped Fiber Amplifiers.
Figure 15:
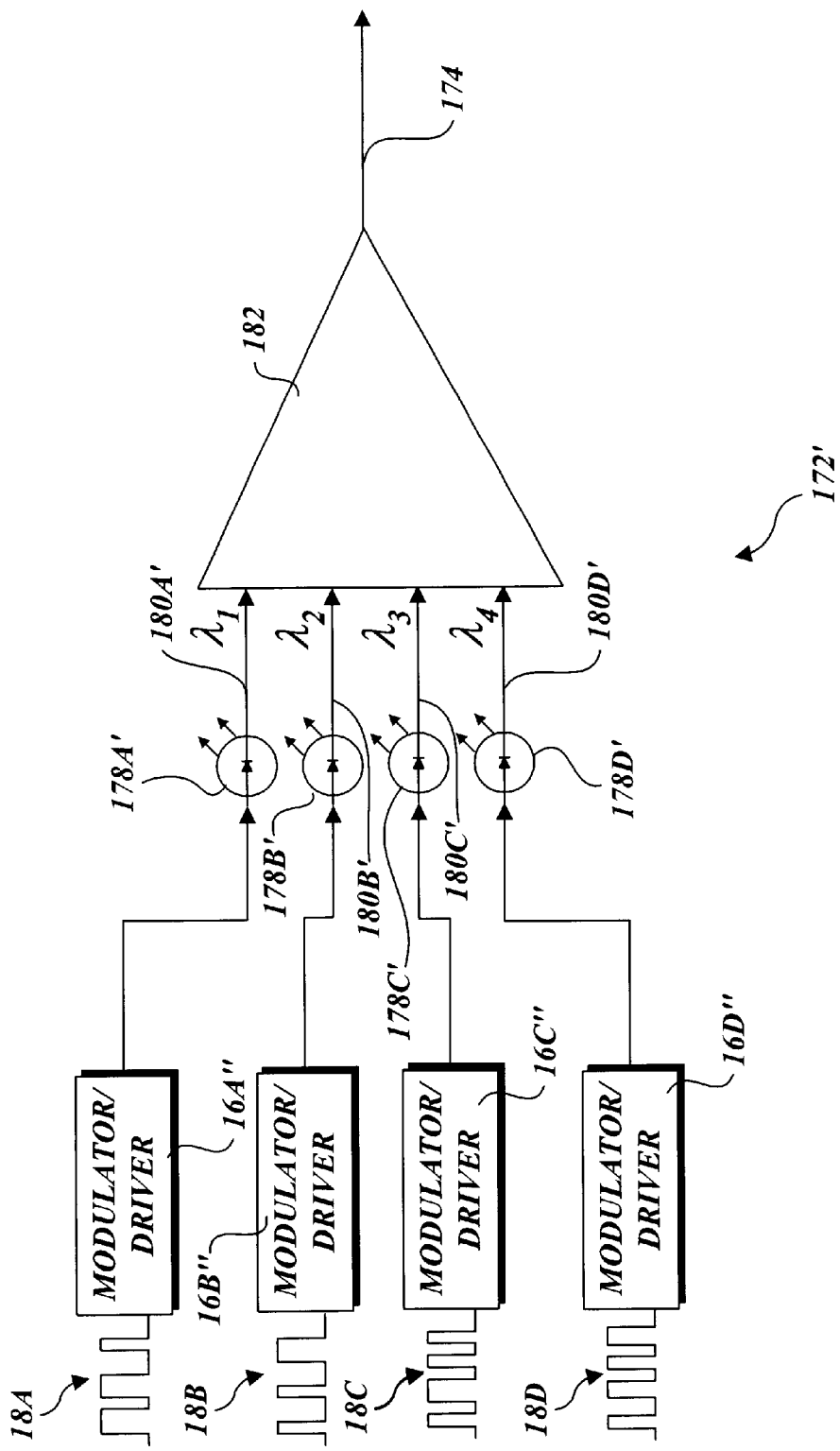
FIG. 15 is a schematic diagram of an embodiment of a laser beam source that employs a plurality of modulated light signals having different wavelengths.

In addition to the embodiments illustrated in FIGS. 14 and 15, optional configurations for optical amplifier-based laser beam sources may be employed, such as those disclosed in co-pending application Ser. No. 09/847,891, filed May 2, 2001, the specification and drawings of which are incorporated herein be reference.

In general, the term "laser beam source" refers to any apparatus or device that can produce an optical signal that may be coupled into multimode fiber, such as Fabry-Perot lasers, Distributed Feedback (DFB) lasers, Vertical Cavity Surface-emitting Lasers (VCSEL), modulated laser sources amplified by medium and high power optical amplifiers, including Erbium-doped Fiber Amplifiers (EDFA), Erbium-Ytterbium Doped Fiber Amplifiers, and Raman amplifiers, Light emitting diodes (LED), super-luminescent diodes (SLD), Semiconductor Optical Amplifiers (SOA), and others.

The embodiments of the invention discussed above may be used to produce mode-scrambled optical signals that are well-suited for FSO communication systems. In particular, the embodiments can generate a uniform extended source optical beam, which mitigates the adverse effects of atmospheric turbulences and window aberrations. Further details of the benefits of optical signals with similar characteristics are discussed in Sidrovich, et al., SPIE Vol. 4635 179–186 (January 2002). The multimode beam combiner is also particularly well-suited for producing higher power signals, since the input and output fibers have larger cores than single mode fiber, reducing the optical power density in the fiber, which in turn reduces the probability of fiber damage and failure.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and Figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus, comprising:
    a plurality of laser beam sources, each to produce a modulated optical beam having data encoded therein via the modulation and having a respective wavelength comprising an input optical signal;
    a plurality of input fiber segments, each comprising a multimode fiber optic core and including an output end and an input end operatively coupled to a respective laser beam source to receive the input optical signal produced by the respective laser beam source;
    an output fiber segment comprising a multimode fiber optic core having a second diameter and including an input end and an output end; and
    a multimode optical beam combiner to operatively couple the output ends of each of the multimode fiber optic cores of the input fiber segments to the input end of the multimode fiber optic core of the output fiber segment,
    wherein, upon operation, the input optical signals are combined into a mode-scrambled free-space optical signal that is emitted from the output end of the output fiber segment, the mode-scrambled free-space optical signal containing the data encoded in the input optical signals.

2. The apparatus of claim 1, wherein the respective wavelengths of the modulated optical beams produced by the respective laser beam sources are substantially matching and each of the input optical signal has a power level, and wherein the multimode optical beam combiner is configured such that a power level of the mode-scrambled free-space optical signal is substantially equal to a sum of the power levels of the input optical signals.

3. The apparatus of claim 1, wherein the multimode optical beam combiner comprises a fusion splice coupling the output ends of the input fiber segments to the input end of the output fiber segment.

4. The apparatus of claim 3, wherein the output ends of the input fiber optic cables are configured in a polar array.

5. The apparatus of claim 3, wherein a portion of each input fiber segment is tapered toward its output end.

6. The apparatus of claim 1, wherein a portion of the output fiber segment is configured in a series of alternating loops.

7. The apparatus of claim 1, wherein the respective wavelengths of the modulated optical beams produced by the respective laser beam sources correspond to n different wavelengths $\lambda_1$–$\lambda_n$, which are combined into he mode scrambled optical signal to form a wavelength division multiplexed (WDM) signal.

8. The apparatus of claim 1, wherein the respective wavelengths of the modulated optical beams comprise at least two different wavelengths, and at least two of the laser beam sources produce redundant input optical signals having substantially common wavelengths.

9. The apparatus of claim 1, wherein an input end portion of the multimode fiber optic core of at least one input fiber segment is configured to receive the input optical signal produced by its respective laser beam source such that the input optical signal is focused at a point on the multimode fiber optic core that is offset from a centerline of the input end portion, thereby creating an offset launch condition.

10. The apparatus of claim 1, wherein an end portion of the multimode fiber optic core of at least one input fiber segment is operatively coupled to its respective laser beam source such that the input optical signal produced by the laser beam source is directed at an acute angle relative to a centerline of the end portion.

11. The apparatus of claim 10, further comprising an off-axis fiber optic mount that operatively couples the input end of at least one input fiber segment to the laser beam source such that the input optical signal is directed at the acute angle relative to a centerline of the end portion.

12. The apparatus of claim 11 wherein fiber mount is coupled to the input end of at least one of the input fiber segments, and wherein its respective laser beam source comprises:
 a housing having a longitudinal axis and a first mounting surface disposed toward a first end that is substantially perpendicular to the longitudinal axis and a second mounting surface disposed toward a second end that is angled relative to the first mounting surface and configured to mate with a mounting surface of the fiber mount;
 a laser diode, mounted on the first mounting surface to emit a laser optical signal along the longitudinal axis; and
 a least one optical component to receive the laser optical signal and converge it towards a focal point to form the input optical signal, said focal point being substantially coincident with the first end of the first segment of fiber optic cable.

13. The apparatus of claim 12, wherein the laser optic signal is converged at an angle that substantially matches a numerical aperture of the input fiber segment.

14. The apparatus of claim 1, wherein the laser beam sources comprise an array of vertical cavity surface-emitting lasers (VCSELs), each active VCSEL in the array emitting a respective modulated laser beam that is received by an optical lens and focused onto the input end of a respective input fiber segment to generate a respective input optical signal.

15. The apparatus of claim 14, wherein a portion oft VCSELs in the array comprise spare VCSELs that may be selectively switched on to replace any active VCSEL(s) that fail.

16. The apparatus of claim 14, wherein the modulate laser beams are focused to impinge on the input end of an input fiber segment so a to produce an offset-launch condition.

17. The apparatus of claim 1, wherein each of the laser beam sources comprise at least one laser source to produce at least one modulated input optical signal that is amplified by an optical amplifier to output a modulated optical signal.

18. The apparatus of claim 17, wherein the laser sources comprise laser diodes.

19. The apparatus of claim 17, wherein the optical amplifier comprises an Erbium-doped Fiber Amplifier (EFDA).

20. The apparatus of claim 17, wherein the modulated optical beams produced by respective laser beam sources comprise different wavelengths, and the respective modulated optical beams are combined into the mode scrambled optical signal to form a wavelength division multiplexed (WDM) signal.

21. The apparatus of claim 17, wherein said at least one laser source for at least one of the laser beam sources comprises a plurality of laser sources that generate respective modulated optical signals having different wavelengths.

22. The apparatus of claim 1, wherein a numerical aperture of the input fiber segments substantially matches a numerical aperture of the output fiber segment.

23. An apparatus, comprising:
 three laser beam sources, each to produce a modulated optical beam having a respective wavelength and having data encoded therein via the modulation;
 three input fiber segments, each comprising one of a 50 or a 62.5 micron graded-index (GI) multimode fiber optic core and including an output end and an input end operatively coupled to a respective laser beam source to receive the modulated optical beam produced by the respective laser beam source;
 an output fiber segment comprising a 200 micron step-index (SI) multimode fiber optic core and including an output end and an input end operatively coupled the output ends of the input fiber optic segments via respective fusion splices,
 wherein, upon operation, the modulated optical beams produced by the laser beam sources are combined into a mode-scrambled modulated free-space optical signal output from the output end of the output fiber segment containing the data encoded in modulated optical beams produced by the three laser beam sources.

24. The apparatus of claim 23, wherein a portion of the output fiber segment is configured in a series of alternating loops.

25. The apparatus of claim 23, wherein the respective wavelengths of the modulated optical beams produced by the respective laser beam sources are substantially matching and each of the input optical signals has a power level, and wherein the multimode optical beam combiner is configured such that a power level of the mode-scrambled free-space optical signal is substantially equal to a sum of the power levels of the input optical signals.

26. The apparatus of claim 23, wherein each laser beam source comprises an offset-coupled laser diode.

27. An apparatus, comprising:
 seven laser beam sources, each to produce a modulated optical beam having a respective wavelength and having data encoded therein via the modulation;
 seven input fiber segments, each comprising a nominal 50 or 62.5 micron graded-index (GI) multimode fiber optic core and including an input end operatively coupled to a respective laser beam source to receive the modulated optical beam produced by the respective laser beam source and having a tapered portion at an output end;
 an output fiber segment comprising a 200 micron step-index (SI) multimode fiber optic core and including an output end and an input end operatively coupled to the output ends of the input fiber segments via respective fusion splices,
 wherein, upon operation, the modulated optical beams produced by the laser beam sources are combined into a mode-scrambled free-space optical signal output from the output end of the output fiber segment containing the data encoded in modulated optical beams produced by the seven laser beam sources.

28. The apparatus of claim 27, wherein the output ends of the seven input fiber segments are configured to comprise a polar array of six output ends centered around an output end of a seventh input fiber segment.

29. The apparatus of claim 27, wherein a portion of the output fiber segment is configured in a series of alternating loops.

30. The apparatus of claim 27, wherein the respective wavelengths of the modulated optical beams produced by the seven laser beam source correspond to at least four different wavelengths $\lambda_1$–$\lambda_4$, which are combined in the m de-scrambled output signal to form a wavelength division multiplexed (WDM) signal.

31. The apparatus of claim 27, wherein the respective wavelengths of the modulated optical beams comprise at least two different wavelengths, and at least two of the laser beam sources produce redundant modulated optical beams having substantially common wavelengths.

32. The apparatus of claim 27, wherein at least one of the input optical signals corresponds to a quality of service (QOS) signal.

33. The apparatus of claim 27, wherein each laser beam source comprises an offset-coupled laser diode.

34. A method for producing a mode-scrambled free-source optical signal, comprising:
   encoding data in each of a plurality of optical beams via modulation of respective optical beams to produce a plurality of modulated optical beams;
   launching each of the modulated optical beams into an input end of a respective input fiber segment to pass through that input fiber segment,
   coupling output ends of the respective input fiber segments into an input end of an output fiber segment using a multimode optical beam combiner that is configured such that a signal strength of each modulated optical beam remains substantially the same as that modulated optical beam passes through the multimode optical beam combiner; and
   passing the multimode optical beams through the output fiber segment to be emitted out of an end of the output fiber segment,
   wherein, as the modulated optical beams pass through the input and output fiber segments, they are converted into a mode-scrambled optical signal containing the data encoded in the modulated optical beams, the mode-scrambled optical signal being emitted out of an end of the output fiber segment as a mode-scramble free-space optical signal.

35. The method of claim 34, wherein at least one of the modulated optical beams in launched into its respective input fiber segment so as to produce an offset launch condition.

36. The method of claim 34, wherein the mode-scrambled free-space optical signal has a substantially-filled numerical aperture.

37. The method of claim 34, wherein a portion of the output fiber segment is configured in a series of alternating loops.

38. The method of claim 34, wherein at least one of the modulated optical beams is directed towards the input end of its respective input fiber segment such that it is received at an offset angle relative to a centerline of an end portion of the input fiber segment.

39. The method of claim 34, wherein each input fiber segment comprises one of a 50 or 62.5 micron graded-index (GI) core, and the output fiber segment comprises a 200 micron step-index (SI) core.

40. The method of claim 34, further comprising focusing at least one of the modulated optical beams such that it converges at an angle that substantially matches a numerical aperture of the input fiber segment it is launched into.

41. The method of claim 34, wherein the multimode optical beam combiner comprises a plurality of fusion splices coupling the output ends of the input fiber segments to the input end of the output fiber segment.

42. The method of claim 34, wherein each modulated optical beam has a respective wavelength and power level, the wavelengths substantially matching, and the multimode optical beam combiner is configured such that a power level of the mode-scrambled free-space optical signal is substantially equal to a sum of the power levels of the modulated optical beams.

43. The method of claim 34, wherein a portion of each input fiber segment is tapered toward its output end.

44. The method of claim 34, wherein each modulated optical beam corresponds to a separate input data stream and has a respective way length $\lambda_1$–$\lambda_n$, and the modulated optical beams are combined into the mode scrambled optical signal to form a wavelength division multiplexed (WDM) signal.

45. The method of claim 34, wherein each modulated optical beam has a respective wavelength, and the respective wavelengths comprise at least two different wavelengths, and at least two of the modulated optical beams comprise redundant modulated optical beams having substantially common wavelengths.

46. The method of claim 34, wherein a numerical aperture of the input fiber segments substantially matches a numerical aperture of the output fiber segment.

47. The method of claim 34, wherein at least one of the modulated optical beams corresponds to a quality of service (QOS) signal.

* * * * *